April 28, 1953  G. R. PAYNE  2,636,407
RECEPTACLE LID LIFTER WITH RECEPTACLE ENGAGING MEANS
Filed June 29, 1951
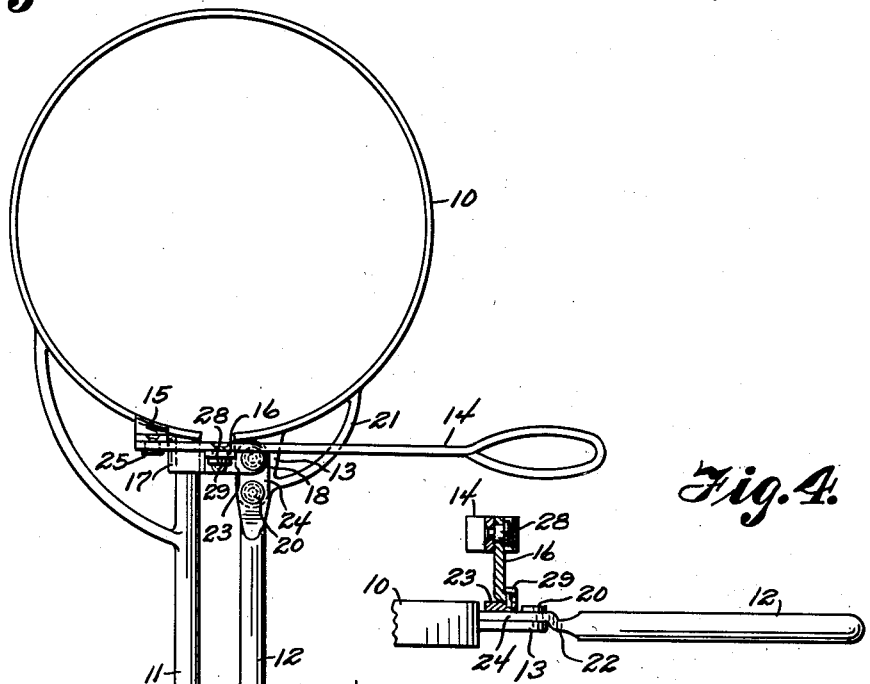
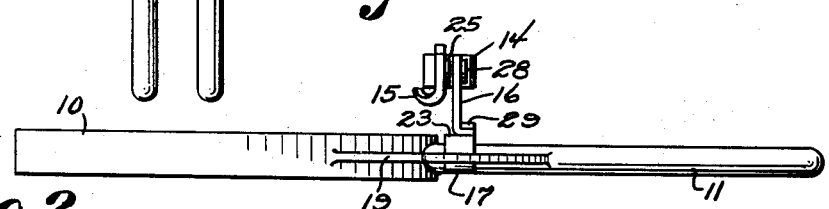
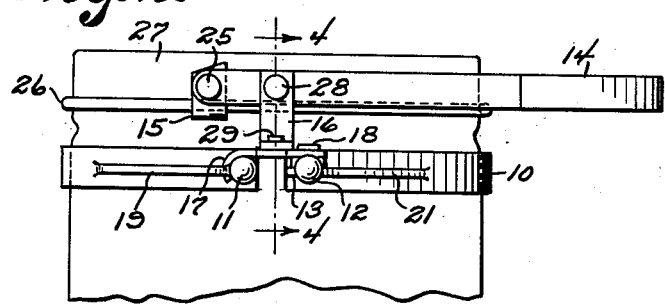
INVENTOR.
George R. Payne
BY Victor J. Evans & Co.
ATTORNEYS Patented Apr. 28, 1953

2,636,407

UNITED STATES PATENT OFFICE 2,636,407

RECEPTACLE LID LIFTER WITH RECEPTACLE ENGAGING MEANS

George R. Payne, Bellingham, Wash.

Application June 29, 1951, Serial No. 234,251

3 Claims. (Cl. 81—3.36)

This invention relates to devices for removing lids from cans particularly of the type used for frozen berries, syrups, and the like, and in particular this invention relates to a band positioned to be clamped by handles extended from the ends thereof around the can and a lever pivotally mounted on an extension extended upwardly from the band and having a lid-gripping jaw on the end thereof whereby with the band clamped around a can with one hand and the lever actuated by the other hand of a person opening the can the lid is readily pried upwardly and easily removed.

The purpose of this invention is to provide means for readily removing lids from cans without bending either the lid or can and without spilling products of the can.

Various devices have been provided for prying lids and tops from cans and jars of different types but where a lid is pressed over the end of a can with sufficient force to provide a seal it is difficult to pry the lid upwardly without bending the lid or can or without spilling products in the can. With this thought in mind this invention contemplates an improved lid remover whereby the lid is gripped and pried upwardly with force and with a comparatively easy movement.

The object of this invention is, therefore, to provide a lid removing tool which is positively held in position and with which the lid is pried directly upwardly thereby eliminating the danger of bending the lid and spilling products in the can.

Another object of the invention is to provide a lid removing tool that may be used without changing the design of the can or lid.

A further object of the invention is to provide a lid removing tool for frozen food cans and the like which is of a simple and economical construction.

With these and other objects and advantages in view the invention embodies a cylindrical band having a handle integral with and extended from one end and a similar handle pivotally mounted on a lug extended from the opposite end of the band and having a hook extended therefrom for gripping the handle on the former end of the band, and a lever having a gripping jaw on the end thereof pivotally mounted on an extension extended upwardly from the hook connecting the pivotally mounted handle to the former handle.

Other features and advantages of the invention will appear from the following description taken in connection with the drawings wherein:

Figure 1 is a plan view of the improved can lid remover.

Figure 2 is a side elevational view looking toward the gripping handles and levers of the remover.

Figure 3 is also a side elevational view taken from a point at a right angle in relation to the view shown in Figure 2.

Figure 4 is a view similar to that shown in Figure 3 with parts broken away and parts shown in section and illustrating in particular an extension on one of the lower pivotally mounted handles for supporting a pivotally mounted lever.

Referring now to the drawings wherein like reference characters denote corresponding parts the improved can lid remover of this invention includes a split band 10 having a handle 11 integral therewith and extended from one end thereof, a handle 12 pivotally mounted on a lug 13 extended from the opposite end of the band and a hand lever 14 having a gripping jaw 15 pivotally mounted on one end thereof and supported by an extension 16 extended upwardly on a hook 17 pivotally connected to the end of the handle 12 by a pin 18.

The band 10, which is preferably formed of metal may be formed of any suitable material and the handles 11 and 12 may be secured thereto by suitable means. The handle 11 is supported from the band by a brace 19 and the lug 13 upon which the handle 12 is pivotally mounted by a pin 20 is supported by a similar brace 21.

The handle 12 is provided with an offset section 22 and a bar 23, on which the hook 17 is positioned, is pivotally attached to the end of the section 24 by the rivet 18 whereby as the handle 12 is moved laterally the hook 17 is actuated to grip or release the handle 11.

The handles 11 and 12 are drawn together to clamp the band 10 on the can and with the handles in the position shown in Figure 1 the hook 17 is snapped over the handle 11.

In opening the can the hand gripping the handles 11 and 12 draws the handles together by reason of the hook 17 being snapped over the handle 11 after the band has been placed on the can whereby upon pressure being applied to the handles 11 and 12 the hook 17 will draw the handle 11 toward the handle 12 until the band 10 is positively clamped on the can. With the band 10 clamped on the can the lever 14 is manually moved downwardly with the other hand while the handles 11 and 12 are being gripped with the first hand. When the handle is moved downwardly the end carrying the gripping jaw is moved upwardly by reason of the pivot pin 28, whereby the gripping jaw 15 which is pivotally mounted on the end of the lever 14 by a pin 25 forces upwardly under a bead or head 26 of a lid 27 whereby upon further downward movement of the handle 14 the lid is forced upwardly and removed from the can by means of the gripping jaw 15.

The lever 14 is pivotally mounted on the upper end of the extension 16 by a pin 28 and the extension 16 is secured to the bar 23 by rivets 29.

It will be understood that modifications may be made in the design and arrangement of the parts without departing from the spirit of the invention.

What is claimed is:

1. A can lid remover comprising a split band having a handle integral with and extended from one end of the band and having a lug extended from the opposite end of the band, a handle pivotally mounted on the said lug and positioned substantially parallel to the former handle, a bar extended from the end of the pivotally mounted handle and having a hook thereon positioned to snap over the handle integral with the end of the band, and a lever having a lid gripping jaw on one end thereof pivotally mounted on the bar at right angles to the handles.

2. In a can lid remover, the combination which comprises a split band positioned to extend around a can and having a handle integral with and extended from one end and a lug integral with and extended from the opposite end, a handle pivotally mounted on the lug, a hook pivotally mounted on the handle carried by the lug and positioned to snap over the handle integral with the band, and a lever having a lid gripping jaw on the end thereof pivotally mounted on the said hook at right angles to the handles.

3. A can lid remover comprising a flat band having a split therein and having a handle integral therewith and extended from one end thereof, a lug integral with the band and extended from the opposite end thereof, a movable handle positioned parallel to the handle integral with the band, means pivotally mounting the movable handle on the lug extended from the end of the band, a hook extended from the pivotally mounted handle and positioned to grip the handle integral with the band, an extension extended upwardly from said hook, a lever pivotally mounted on the said extension at right angles to the handles, and a gripping jaw having a hook-shape lower end pivotally mounted on the said lever.

GEORGE R. PAYNE.

References Cited in the file of this patent

UNITED STATES PATENTS

| Number | Name | Date |
|---|---|---|
| 961,224 | Fischer | June 14, 1910 |
| 1,492,908 | Trumbo | May 6, 1924 |
| 1,575,568 | Gerhart | Mar. 2, 1926 |
| 1,711,225 | Crowell | Apr. 30, 1929 |